Sept. 17, 1940.    F M. CLARK    2,214,877

COOLING AND INSULATING COMPOSITION

Filed Sept. 3, 1938

IMPREGNATED WITH
CHLORINATED PARAFFIN
PRODUCTS

CONTAINS LIQUIDS
COMPRISING CHLORINATED
PARAFFIN PRODUCTS.

Inventor:
Frank M. Clark,
by Harry E. Dunham
His Attorney.

Patented Sept. 17, 1940

2,214,877

UNITED STATES PATENT OFFICE 2,214,877

COOLING AND INSULATING COMPOSITION

Frank M. Clark, Pittsfield, Mass., assignor to General Electric Company, a corporation of New York Application September 3, 1938, Serial No. 228,382

2 Claims. (Cl. 252—1)

The present invention comprises new compositions suitable for insulating and dielectric use. Preferred forms of such compositions in liquid form are capable of withstanding extremely low temperatures without solidifying. It also comprises improved capacitors, transformers, cables and other electric devices containing new compositions embodying my invention.

In my prior Patents 1,931,373 and 1,931,455 have been described and claimed various halogenated hydrocarbons of the aromatic (aryl) type which function efficiently as insulating elements in electrical apparatus without being chemically reactive with respect to the other elements of an electrical device, and in particular with respect to copper and other metallic parts. Previously, many attempts had been made to employ in electric devices halogenated aliphatic or chain series compounds such, for example, as carbon tetrachloride or chlorinated derivatives of ethane, propane, or the like. However, such compounds were found to be unsuitable for various reasons, one reason being their chemical instability which resulted in attack of metal and other parts of such devices.

My present invention is based on the discovery that highly chlorinated high molecular weight aliphatic compounds, when suitably prepared and purified, can be used without corrosive effects when in contact with metals in electric devices.

My present invention includes liquid compositions containing products of this type, preferably highly chlorinated paraffin products, together with a chlorinated liquid. Such compositions have the required combination of physical and chemical properties required for insulating and dielectric materials.

Figure 1:
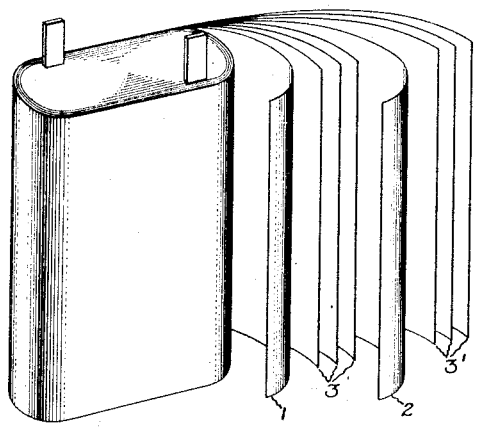
Figure 2:
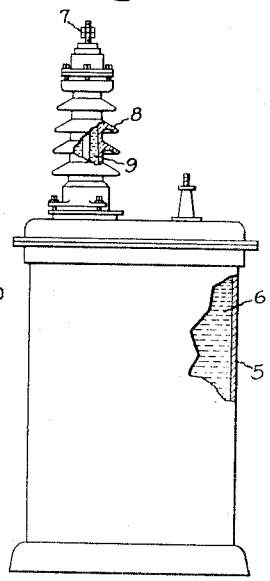

The accompanying drawing shows in Fig. 1 a capacitor, and in Fig. 2 a transformer as representative of electric devices embodying my invention.

In carrying out my invention a suitable aliphatic compound such, for example, as paraffin wax or paraffin oil is caused to combine with chlorine, or other suitable halogen. Preferably, the material to be chlorinated, such as paraffin wax, is dissolved in a suitable solvent, such as carbon tetrachloride, which itself does not combine with chlorine under the conditions employed. Chlorine gas may be conducted into such a solution, the latter being maintained at a temperature of about 70° to 75° C., or at any rate below 100° C. A catalyst is not required, and preferably is not used. Other suitable solvent liquids for carrying out the reaction in solution are trichlorbenzene, tetrachlor ethylene, chlorinated ethane and the like, or mixtures thereof. Suitable chlorinated products may be made by treating with chlorine in a reflux condensing system 5 parts of paraffin wax in 15 parts of carbon tetrachloride (by weight), the latter being heated to the boiling temperature during the reaction, which is in the desired range of 70° to 80° C. The reaction preferably should be caused to proceed until a product results having a content, exclusive of the solvent, of at least about 50 per cent chlorine, and preferably to about 75 per cent chlorine. If the product is to be used as an ingredient in a composition which not only is noninflammable, but evolves noninflammable gas when decomposed, then a chlorinated paraffinic product containing at least about 64 per cent of chlorine should be chosen.

When sufficient chlorine has been combined with the paraffinic compound (and this fact may be determined by weight change) the solvent may be partly or wholly removed by vacuum distillation. It is advisable not to remove the solvent completely before the product is purified. The solution preferably is treated with an alkali, such as a solution of calcium hydroxide, or dilute sodium hydroxide, a mild alkali being preferred. If the chlorinated product is produced in the presence of a solvent (for example, carbon tetrachloride), which is not desired as a component of the finished product, then such solvent may be displaced by adding a desired liquid component, for example, trichlorbenzene, and removing the undesired component by distillation.

A chlorinated paraffin wax containing at least about 55 per cent of chlorine is a rosin-like solid. The melting point increases with increase of chlorine content. For example, a chlorinated paraffin wax containing about 25 per cent of chlorine is a liquid having a pour point of about 11° C., the viscosity at 37.8° C. being about 238 seconds Saybolt, the specific gravity being .985, and having at 25° C. a dielectric constant of 5.6. Chlorinated paraffin wax containing 50 per cent chlorine is a viscous liquid having a viscosity at 100° C. of 650 seconds Saybolt, a pour point of 21° C., having at 25° C. a specific gravity of 1.294, and a dielectric constant of 8.1.

This relatively high dielectric constant renders this 50 per cent chlorine product advantageous as a capacitor dielectric. This material fortunately also is characterized by a low power factor. At room temperature, the power factor is about .03 per cent, or even lower. Even at 100° C. the power factor at 60 cycle frequency is only about .05 per cent.

A capacitor such as shown, for example, in Fig. 1 of the drawing may be made up of armatures 1, 2 of metal foil and interposed groups of sheets 3 and 3' of capacitor paper, for example, three sheets of .0004 inch kraft tissue. When it is impregnated with chlorinated paraffin containing about 50 per cent chlorine by weight, then an electrical capacity of about 6.6 microfarads for a given unit is obtained.

A capacitor which is similar as far as its size and physical structure is concerned, that is, containing the same kind of foil and paper for impregnating with mineral oil, has an electrical capacity of 3.5 microfarads. When impregnated with chlorinated diphenyl, which is well known as an efficient dielectric material, a capacitor otherwise the same has an electrical capacity of 5 microfarads.

It will be observed that the capacity obtained with an impregnant consisting of chlorinated paraffin is about 32 per cent higher than the electrical capacity obtainable when utilizing chlorinated diphenyl as the impregnant. The result of this improvement is that for a given microfarad capacity a unit of much smaller cubical content can be used. This is important when capacitors are intended to form a part of electrical apparatus in which there is very little room for the placing of a capacitor within the usual storage space of the apparatus. For example, a capacitor impregnated with chlorinated diphenyl, which compares favorably with other impregnating materials for industrial capacitors in the high voltage field, requires a cubical content of about 3.8 cubic inches for each microfarad of electrical capacity. On the other hand, a capacitor impregnated with chlorinated paraffin requires only about 2.64 cubic inches for each microfarad of electrical capacity. Capacitors embodying my present invention, that is, containing chlorinated paraffin, are well adapted for high and low voltage application in the direct current field, and for application in the alternating current field at voltages less than about 800 to 900 volts.

When containing about 70 per cent chlorine, the chlorinated product is a brittle, resinous solid having a flow point by the ball and ring test of about 90° to 100° C., having at 140° C. a specific gravity of 1.6, and having at 25° C. a dielectric constant of 4.5. Its color is light yellow. Its viscosity at 130° C. is 25,000 seconds Saybolt.

When a chlorinated product containing about 64 per cent chlorine is decomposed by an electric arc, the gases evolved consist of about 88 per cent hydrogen chloride, and about 9.5 per cent of inflammable gases. Such a material, while capable of use for insulating purposes, particularly in association with a chlorinated hydrocarbon which will produce a resultant liquid composition as, for example, trichlorbenzene, has some disadvantages due to the inflammable component of the gases resulting from the decomposition of the composition. Compositions consisting of approximately equal parts by weight of such chlorinated wax (64 per cent chlorine) and trichlorbenzene yield decomposition gases which contain only about 5 per cent of inflammable gas. This proportion will not result in dangerous explosions when such gases are mixed with air.

However, it is preferred that the percentage of chlorine in the chlorinated wax should be so high that the inflammable component in a gaseous decomposition product will be even less. A chlorinated wax containing about 71 to 72 per cent chlorine, when associated with trichlorbenzene, results in a composition which is wholly noninflammable and yields only noninflammable decomposition gases. Preferably, for compounding such a solution about 60 parts by weight of such a highly chlorinated product and 40 parts of trichlorbenzene should be employed. The inflammable component of gases evolved from such a mixture is about 1 per cent or less.

While such a composition has a pour point of about 0° C., a lower flow point is desirable for some purposes. The flow point can be reduced by increasing the proportion of trichlorbenzene or equivalent chlorinated liquid component. For example, a composition consisting by weight of 40 parts of such highly chlorinated wax (71.7 per cent) and 60 parts of trichlorbenzene has a pour point of −7° C.

Materially lower pour point and even smaller amounts of inflammable component in eventual decomposition gases will result, if as one ingredient of the composition there is present substantial proportion of either the 1,2,3,4 or 1,2,3,5 isomer of tetrachlorbenzene. For example, a composition consisting by weight of the following ingredients has a pour point of −10° C. and a viscosity at 37.8° C. of 1010 seconds Saybolt.

| | Parts |
|---|---|
| Chlorinated paraffin (71.7% Cl) | 51 |
| Trichlorbenzene | 34 |
| Tetrachlorbenzene (1,2,3,4 isomer) | 15 |

A composition consisting by weight of the following ingredients has a pour point of −28° C. and a viscosity at 37.8° C. of 94 seconds Saybolt:

| | Parts |
|---|---|
| Chlorinated paraffin (71.7% Cl) | 34 |
| Trichlorbenzene | 51 |
| Tetrachlorbenzene (1,2,3,4 isomer) | 15 |

In such a composition the component of combustible gases in a gaseous mixture resulting upon decomposition is less than .5 per cent.

The pour point can be further reduced by increasing the tetrachlorbenzene component. The following compositions are illustrative:

(a) A composition having a pour point of −26° C. contains by weight:

| | Parts |
|---|---|
| Chlorinated paraffin wax (50% Cl) | 45 |
| Trichlorbenzene | 40 |
| Tetrachlorbenzene (1,2,3,4 isomer) | 15 |

(b) A composition having a pour point as low as −40° C. contains by weight:

| | Parts |
|---|---|
| Chlorinated paraffin wax (50% Cl) | 50 |
| Trichlorbenzene | 25 |
| Tetrachlorbenzene (1,2,3,4 isomer) | 25 |

In a similar way, compositions may be prepared from chlorinated paraffin oil, chlorinated kerosene, and other chlorinated aliphatic hydrocarbons.

Chlorinated paraffin products which have relatively high chlorine content have a somewhat lower dielectric constant than the 50 per cent chlorine product. As stated, the product containing about 70 per cent chlorine has a dielectric constant less than 5. This product, nevertheless, can be used advantageously as a capacitor dielectric in the field of relatively high frequencies. When subjected to frequencies of 1000 cycles or higher, the power factor of this product is .3 per cent or less.

Liquid insulating and cooling compositions containing highly chlorinated products of relatively low power factor are well suited for the transformer field. The lower dielectric constant materials have been found from various aspects to possess advantages in this field. The power factor of cooling liquids in transformers is not of major importance. The liquid compositions above described have each a power factor below 5 per cent.

Fig. 2 shows a transformer in side elevation, the inductive elements (primary and secondary windings) not being illustrated. The tank 5 is shown partly broken away to reveal the cooling liquid 6, which may consist of one of the liquid compositions above described. The high tension terminal 7 also shows the bushing wall 8 partly broken away to reveal a liquid, or semi-liquid, content 9 which may consist of chlorinated paraffinic product, and preferably such a product associated with a chlorinated liquid diluent to form a liquid or pasty product.

What I claim as new and desire to secure by Letters Patent of the United States is:

1. A liquid dielectric and insulating composition consisting essentially of a mixture of chlorinated paraffin wax, trichlorbenzene, and tetrachlorbenzene chosen from the group consisting of the 1,2,3,4 and 1,2,3,5 isomers, said mixture having a pour point at least as low as 10° C.

2. A liquid dielectric and insulating composition consisting by weight of about 45 to 50 parts of chlorinated paraffin wax containing at least about 50 per cent chlorine, about 25 to 40 parts of trichlorbenzene, and about 15 to 25 parts of the 1,2,3,4 isomer of tetrachlorbenzene.

FRANK M. CLARK.